Figure 1:
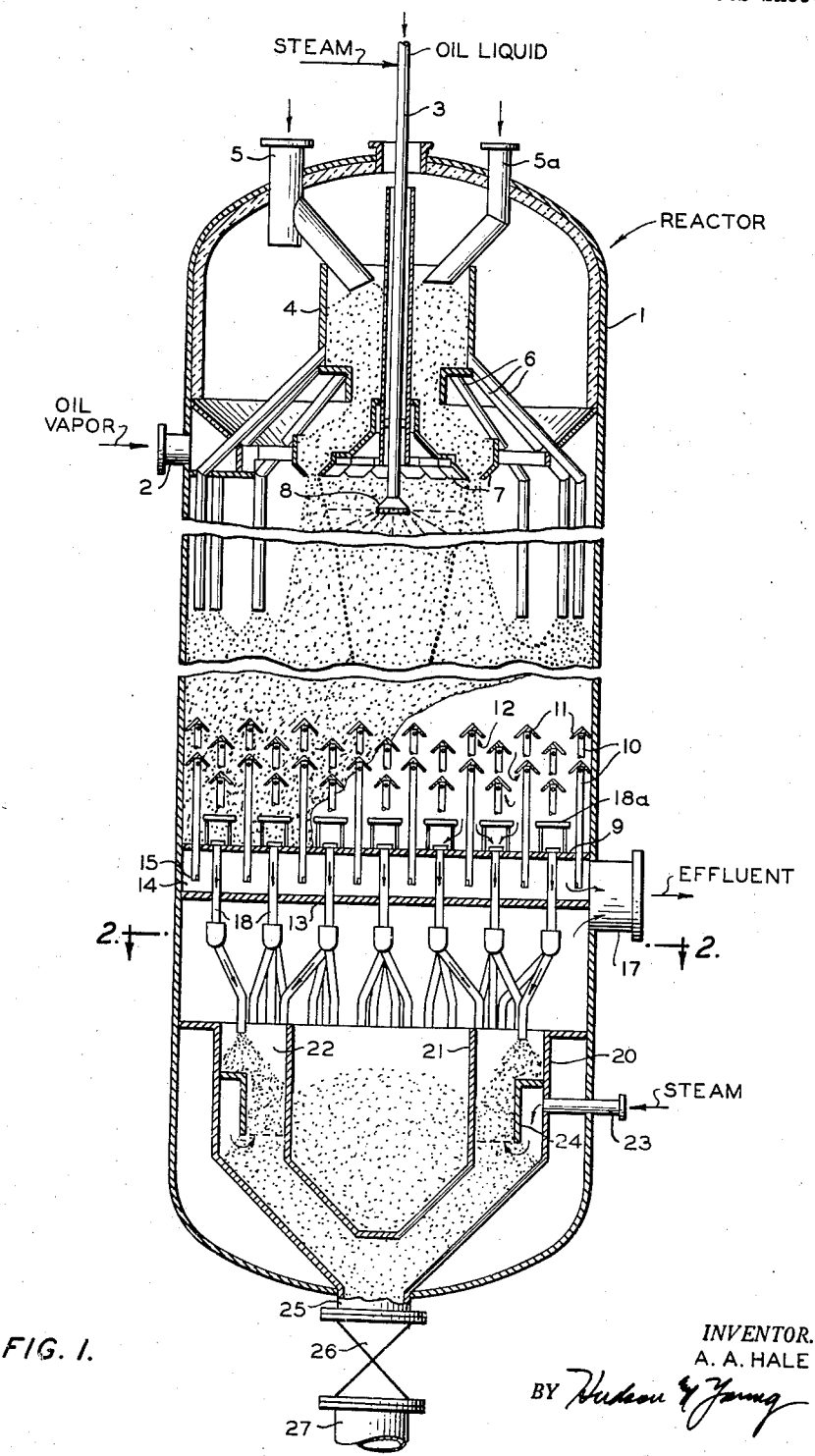

INVENTOR.
A. A. HALE

ATTORNEYS

United States Patent Office 2,851,403
Patented Sept. 9, 1958

2,851,403

MULTIPLE-LEVEL TCC CATALYST STRIPPING

Alfred A. Hale, Woods Cross, Utah, assignor to Phillips Petroleum Company, a corporation of Delaware Application January 3, 1955, Serial No. 479,307

3 Claims. (Cl. 196—52)

The invention is directed to an improved method and means for stripping the spent catalyst in a hydrocarbon conversion system. More specifically, it relates to a method and means for stripping at several levels the spent cracking catalyst from a TCC unit.

When petroleum hydrocarbons contact a catalyst under conversion conditions which include temperatures of 600 to 1100° F. to form products containing hydrocarbons different in molecular weight or structure or both, carbonaceous material or coke is deposited in the pores of the catalyst and causes a reduction in catalytic activity. The catalyst is therefore periodically regenerated by contact with an oxygen-containing gas under combustion conditions to burn off the coke and thus restore catalytic activity. In the catalytic cracking of hydrocarbons this process may be made continuous by circulating the catalyst through the reactor and regenerator.

When the catalyst particles are passed to the regeneration zone the adsorbed and occluded hydrocarbons are burned along with the coke or carbonaceous material. When the hydrocarbon feed being cracked is a high coke forming stock and the catalyst particles contain adsorbed and occluded hydrocarbons in addition to a large amount of coke, there is danger of overheating the catalyst particles. Also the time of regeneration is increased with more combustible material on the catalyst. Hence, before regenerating it is necessary to strip or purge the solid particles to remove volatile hydrocarbons therefrom so that the load on the regenerator is reduced. These hydrocarbons may then be separately condensed and used as part of the feedstock or returned in vapor form to the cracking zone or combined with the cracked products.

According to the present invention the spent catalyst particles are withdrawn from a cracking zone and passed to a stripping zone before they are introduced into the regenerator. In this operation the stripping steam countercurrently contacts the spent catalyst prior to its transfer to the regenerator. The novel feature of this invention lies in the restripping of this first stripped catalyst by adding additional steam or other stripping gas to the bottom of the catalyst standpipe between the reactor and the regenerator. This secondary stripping of the catalyst further reduces the hydrocarbon loss from the reactor, reduces the load on the regenerator, cuts down the smoke plume from the regenerator flue stack, and employs less steam than would be necessary to effect the same degree of stripping if all the gas were introduced at one level.

The principal object of the present invention is to provide an improved means and method for stripping hydrocarbons from the catalyst in a TCC system. A more specific object is to effect improved stripping in a TCC reactor with the use of a minimum volume of stripping gas. A further object is to effect the aforesaid improvements with a minimum entrainment of catalyst fines in the reactor effluent gases.

Figure 2:
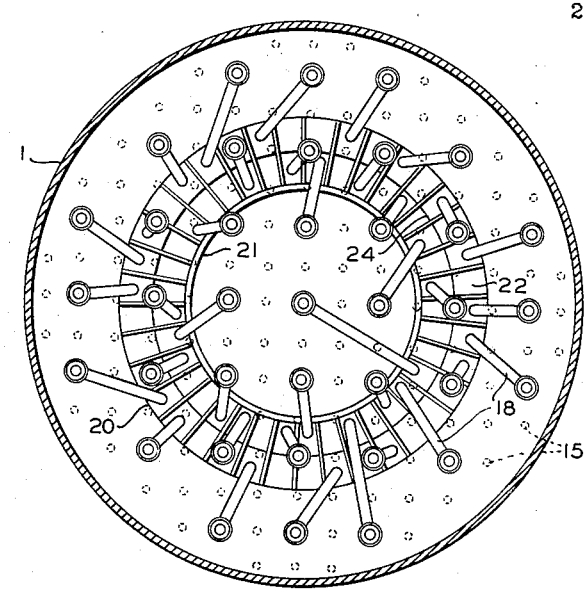
Figure 3:
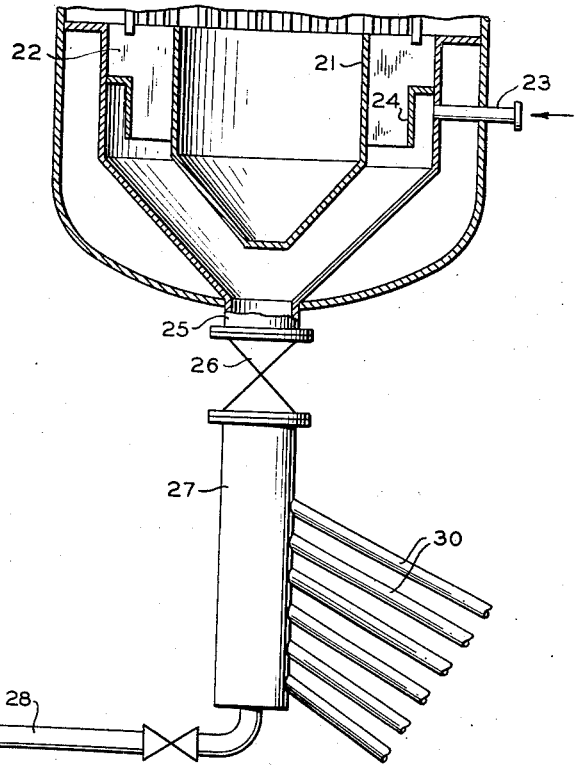

The invention can best be illustrated by referring to the accompanying drawings wherein Figure 1 represents a vertical cross-section of the reactor, Figure 2 is a plan view of the reactor's stripping section taken along cutting plane 2—2 of Figure 1, and Figure 3 is a view, partly in section, of the base of the reactor and catalyst standpipe.

Referring to Figure 1, TCC reactor 1 is charged with a stream of vaporized feedstock such as gas oil through line 2 and a mixture of liquid feedstock and superheated steam enters the top of the reactor through line 3. Catalyst is charged to distributor 4 through conduits 5, 5a and discharges through the outer peripheral circle of distributor pipes 6 and through the inner circle of distributor outlets 7. The inner circle surrounds the downwardly directed spray of liquid feedstock discharged through nozzle 8 in line 3, forming a cylindrical curtain to prevent the spray from splashing on the reactor walls and coking there. At the outlet of the distributor pipes the catalyst forms a compact bed supported by a horizontal grid plate 9. A plurality of spaced vapor-collector tubes 10 extend through grid 9 with their lower ends terminating within the vapor space 14 between lower grid 13 and grid 9. These tubes are each covered by an inverted cup-shaped member 11 which acts as an umbrella, permitting the vapors to be drawn in through orifices 12 without obstruction from the catalyst particles. Tubes 10 are notched near their base to form discharge ports 15 through which vapors are discharged into vapor space 14 and effluent nozzle 17, passing to suitable fractionating means not shown. Catalyst is conducted through vapor space 14 by a plurality of pipes 18 extending from the base of the catalyst bed down through grids 9, 13 and discharge into the stripping space below grid 13. Tubes 18 are partially covered by members 18a to provide a funneling action for the drawage of catalyst from the main bed into the pipes.

The stripping mechanism consists essentially of two concentric vertical cylinders 20 and 21, the intervening space being divided into a number of cells 22 (Figure 2). Each catalyst pipe 18 discharges into an individual cell as shown in Figure 2. Inner cylinder 21 is provided with a conical closed bottom; the base of outer cylinder 20 also tapers inwardly parallel to the base of cylinder 21 but opens into discharge pipe 25. Catalyst particles pass through the cells 22 as a plurality of compact columns and are stripped therein by steam entering the reactor through line 23 and discharging into cylinder 20. Baffle ring 24 projecting from the inner wall of cylinder 20 forces the incoming steam downwardly and toward the center of cells 22; from this point it flows up through the cells. The steam and stripped vapors emerge from the tops of the cells and are withdrawn from the overhead vapor space through nozzle 17. The fines are entrained by the stripping steam passing through the several cells and collect, in part, within inner cylinder 21. The catalyst withdrawn from the reactor through discharge pipe 25 passes through valve 26 into standpipe 27.

Referring now to Figure 3, an auxiliary stream of stripping steam is admitted to the base of standpipe 27 through line 28; this steam passes up through the standpipe 27, discharge pipe 25, and cells 22, and is discharged along with other effluent through nozzle 17. A plurality of distributor pipes 30 drain catalyst from standpipe 27 into a regenerator kiln (not shown) wherein the coke is burned off in a conventional manner and regenerated catalyst returned to the reactor 1.

In a typical embodiment of the above system (the following figures are approximations only) reactor 1 is a 10,000 barrel/day TCC reactor approximately 50 feet high and 12 feet in diameter. The feed stock is gas oil; design temperature and pressure is 1000° F. and 25 pounds, but operation will be at 825° to 950° F. and about 11 pounds. The catalyst is preferably acid treated clay and is circulated through the system at a rate of 240 to 250 tons/ hour. Effluent gas is withdrawn through nozzle 17 at 900° F. and the cracked products therein separated by conventional methods including, for example, fractionation. The stripping steam is admitted at a pressure of 165 pounds and a temperature of 700° F. The rate at which steam is admitted directly to the cells is about 2500 pounds per hour, and the rate of injection to the standpipe about 500 pounds/hour. This compares favorably with the 3200 to 3600 pounds per hour of steam which was found necessary when the steam was all admitted at the upper level of the reactor.

In addition to this overall reduction in the amount of steam required, the fact that the major reduction is effected at the upper level means a proportionate reduction in the entrainment of fines in the effluent gases withdrawn through nozzle 17. The most important advantage, probably, in stripping by the present method is the fact that the multiple steam injection actually effects superior stripping as compared to that obtained from injecting all the steam at one level; this, of course, means the recovery of a higher yield of hydrocarbons from the reactor and a reduction in the smoke output from the regenerator. A major factor in the latter improvement is in alleviating the problem which sometimes arises in the present TCC system when one or more of the catalyst downcomer pipes which empty into the cells 22 become plugged; as soon as the cell supplied by the plugged lines becomes empty there is a channeling of stripping steam through the resulting void. This, of course, results in an almost complete failure of stripping in the remaining cells and a proportionate loss of hydrocarbons from the system before the stoppage is discovered. By injecting steam into the standpipe, however, a considerable portion of the hydrocarbons which would otherwise be lost can be salvaged and recovered with the reactor effluent instead of lost to the regenerator.

While I have illustrated a specific form of the invention in the drawings and have given a specific example of operation conditions, it is to be understood that these are illustrative not limiting and various modifications may be made without departing from the spirit of the invention.

I claim:

1. In a process of hydrocarbon conversion wherein a moving bed of catalyst is withdrawn from the reaction zone as a plurality of compact first columns of downwardly moving contiguous catalyst particles, an inert purge gas is admitted to the base of each of said first columns and withdrawn from the surfaces thereof, and said first columns are then combined into a single moving column of contiguous particles, and wherein blocking of catalyst flow to one or more of said first columns being stripped by said purge gas results in the evacuation of the columns thus affected and a resultant channeling of said purge gas through the resulting void, the improvement comprising injecting additional inert purge gas into the lower portion of said single column of catalyst, forcing said additional purge gas through said single column and also through the aforesaid plurality of columns, and withdrawing said additional purge gas at the surface of said first columns along with the purge gas initially admitted thereto.

2. In a process of continuously catalytically cracking petroleum hydrocarbons in the presence of particle-form solid catalyst wherein a moving bed of catalyst gravitates downwardly through a conversion zone as a compact column of contiguous particles and the feedstock is passed under cracking conditions concurrently through said column of catalyst, fresh catalyst is admitted to the top of the conversion zone and spent catalyst withdrawn from the base thereof as a plurality of compact first columns, said first columns are combined into a single moving column of contiguous catalyst particles which is passed to an underlying regeneration zone, an inert stripping gas is admitted to the base of each of said first columns and withdrawn from the surfaces thereof, and the cracked product removed at a level intermediate the bottom of the conversion zone and the top of said underlying regeneration zone, and wherein blocking of catalyst flow to one or more of said first columns being stripped results in the evacuation of the columns thus affected and a resultant channeling of said stripping gas through the resultant void, the improvement comprising injecting additional inert stripping gas into said single moving column of catalyst, and withdrawing said stripping gas and resulting stripped hydrocarbon vapors from the catalyst as one combined stream, and removing said stream from the system in admixture with the aforesaid cracked product.

3. In a hydrocarbon conversion system wherein a moving bed of catalyst gravitates through the reactor as a single compact column of contiguous particles, feedstock is passed concurrently through said column, vaporous conversion products are separated from the lower portion of the moving catalyst bed and collected in a vapor space beneath said bed, fouled catalyst is withdrawn from the base of the reactor as a plurality of compact first columns of downwardly moving contiguous particles and recombined into a single lowermost moving column, stripping gas is introduced from a common header into the base of each of said first columns and withdrawn from the top thereof along with stripped vapors, these gases in admixture with the hydrocarbon conversion products are removed from the system to suitable gas separation means, and wherein the accidental blocking of catalyst flow to one or more of said first columns being stripped results in the evacuation of said first columns thus affected and a resultant channeling of the stripping gas through this void, the improvement comprising injecting secondary stripping gas into the base of the lowermost column of contiguous catalyst particles under sufficient pressure to force it up through said lowermost column and through the aforesaid plurality of said first columns, said secondary stripping gas being removed from the system in admixture with the other gases.

References Cited in the file of this patent

UNITED STATES PATENTS

| | | |
|---|---|---|
| 2,541,801 | Wilcox | Feb. 13, 1951 |
| 2,546,625 | Bergstrom | Mar. 27, 1951 |
| 2,553,561 | Evans | May 22, 1951 |
| 2,560,343 | Hemminger | July 10, 1951 |
| 2,587,554 | Weikart | Feb. 26, 1952 |
| 2,599,568 | McKinney | June 10, 1952 |
| 2,737,479 | Nicholson | Mar. 6, 1956 |
| 2,753,295 | Ramella | July 3, 1956 |